United States Patent
Yen et al.

(10) Patent No.: US 8,506,820 B2
(45) Date of Patent: Aug. 13, 2013

(54) PROCESS AND APPARATUS FOR ONLINE REJUVENATION OF CONTAMINATED SULFOLANE SOLVENT

(75) Inventors: Ping-Wen Yen, Taipei (TW); Yuh-Sheve Ho, Taipei (TW); Hung-Tzu Chiu, Taipei (TW); Chung-Jong Hwu, Taipei (TW); June-Cheng Chang, Taipei (TW); Tzong-Bin Lin, Taipei (TW); Tsoung Y. Yan, Philadelphia, PA (US); Cheng-Tsung Hong, Taipei (TW); Hung-Chung Shen, Taipei (TW)

(73) Assignee: CPC Corporation, Taiwan, Taipei (TW)

( * ) Notice: Subject to any disclaimer, the term of this patent is extended or adjusted under 35 U.S.C. 154(b) by 29 days.

(21) Appl. No.: 13/345,359

(22) Filed: Jan. 6, 2012

(65) Prior Publication Data
US 2012/0165551 A1    Jun. 28, 2012

Related U.S. Application Data

(62) Division of application No. 12/112,623, filed on Apr. 30, 2008, now abandoned.

(51) Int. Cl.
*B01D 35/06* (2006.01)
*B03C 1/14* (2006.01)

(52) U.S. Cl.
USPC ........... 210/695; 210/805; 210/806; 210/634; 210/790; 210/223; 209/214; 209/215; 585/857

(58) Field of Classification Search
USPC ............. 210/695, 805, 806, 634, 790, 223; 585/857; 209/214, 215
See application file for complete search history.

(56) References Cited

U.S. PATENT DOCUMENTS

| 2,385,431 | A | * | 9/1945 | Vose | 208/284 |
| 2,459,534 | A | * | 1/1949 | Kennedy | 210/223 |
| 3,448,040 | A | * | 6/1969 | Little et al. | 585/319 |
| 4,298,456 | A | * | 11/1981 | Coombs et al. | 208/86 |
| 4,619,770 | A | * | 10/1986 | Boston | 210/772 |
| 4,764,278 | A | * | 8/1988 | Chou et al. | 210/634 |

(Continued)

FOREIGN PATENT DOCUMENTS

| EP | 0065878 A1 | 12/1982 |
| EP | 0110674 A2 | 6/1984 |
| EP | 0584831 A1 | 3/1994 |

OTHER PUBLICATIONS

PCT/US2009/005672 search report dated Apr. 24, 2012.

*Primary Examiner* — David C Mellon
(74) *Attorney, Agent, or Firm* — Cascio & Zervas

(57) ABSTRACT

A continuous online process for rejuvenating whole stream of contaminated lean sulfolane in an extraction system is provided. A rejuvenator is installed in the solvent circulation loop to remove the contaminants continuously to keep the solvent clean, effective and less corrosive. The rejuvenator includes a high pressure vessel with a removable cover and a round rack with vertical stainless steel tubes fitted in the high pressure vessel. A magnetic bar is placed in each stainless steel tube. A screen cylinder is installed outside the ring of stainless steel tubes. As the contaminated sulfolane is passed through the rejuvenator, the rejuvenator picks up contaminants. The rejuvenator can be dissembled to remove the contaminants periodically. The rejuvenator is simple in construction, reliable in operation, and low in operation and maintenance costs. With this rejuvenator, the extraction system operates at high efficiency and high capacity without the dreaded corrosion.

20 Claims, 4 Drawing Sheets

(56) References Cited

U.S. PATENT DOCUMENTS

| | | | |
|---|---|---|---|
| 4,944,917 A * | 7/1990 | Madden et al. | 422/13 |
| 4,946,589 A * | 8/1990 | Hayes | 210/222 |
| 5,043,063 A * | 8/1991 | Latimer | 210/222 |
| 5,188,239 A * | 2/1993 | Stowe | 209/223.1 |
| 7,879,225 B2 * | 2/2011 | Lee et al. | 208/313 |
| 2004/0182769 A1 | 9/2004 | Fogel | |
| 2007/0068862 A1 * | 3/2007 | Sisemore | 210/222 |
| 2009/0255853 A1 * | 10/2009 | Lee et al. | 208/312 |

* cited by examiner

PROCESS AND APPARATUS FOR ONLINE REJUVENATION OF CONTAMINATED SULFOLANE SOLVENT

REFERENCE TO RELATED APPLICATIONS

This application is a divisional application of U.S. patent application Ser. No. 12/112,623 that was filed on Apr. 30, 2008, now abandoned.

FIELD OF THE INVENTION

The present invention relates to a process for on line rejuvenation of contaminated sulfolane solvent in an aromatic extraction system continuously to maintain the solvent quality at the desired level. More particularly, it relates to a process employing a novel rejuvenator in the circulation loop to remove the sulfolane degradation and corrosion products, including acids, polymers and small solid particles of iron and sand to maintain the solvent at a high quality level, and in turn, a high operation efficiency and a low corrosion extraction system. Moreover, by removing these contaminants, the rate of sulfolane degradation is greatly reduced, leading to minimum consumption of sulfolane. The present invention is characterized by high efficiency for contaminants removal, simple construction, and low operation and maintenance costs.

BACKGROUND OF THE INVENTION

Sulfolane, $C_4H_8O_2S$ is also known as tetrahydrothiophene-1,1-dioxide and tetramethylene sulfone. Sulfolane is used as an extraction and a reaction solvent. It is used to separate aromatic hydrocarbons (benzene, toluene and xylenes) from non-aromatics, such as paraffins and naphthenes. It is used to separate n-propyl alcohol and sec-butyl alcohol. It is used to purify natural gas streams and for fractionation of fatty acids into saturated and unsaturated components.

A sulfolane unit is usually incorporated within an aromatics complex to recover high-purity benzene and toluene products from reformate and pyrolysis gasoline. In a modern aromatics complex, the sulfolane unit is located downstream of the reformate splitter column.

In sulfolane extraction column, aromatics are dissolved in sulfolane and this mixture is the extract phase (bottom), while the remaining non-aromatics counter-currently contacted and efficiency of stage can be improved by mixing with rotating baffles such as rotating disk column, RDC.

Sulfolane is recovered from raffinate first in a coalescer and then in a water wash column. The final raffinate is pumped to Naphtha Blending as gasoline components.

The extract is stripped and enriched in aromatics after recontacting with additional sulfolane. The solvent is recovered under vacuum distillation from the extract; while the extract is separated from water by cooling and clay treated to eliminate olefins and diolefins, and sent to Aromatics Fractionation Unit to separate benzene, toluene.

In the sulfolane extraction system, there are often severe corrosion problems. The locations most often corroded by contaminated sulfolane include the rich solvent line to the stripper, extractive stripper column, reboilers, transfer lines and solvent recovery column. As the corrosion rate increases, pinholes can develop, leading to safety and hazard concerns.

The root cause of the corrosion is mostly the accumulation of acidic material in the circulating solvent. The contaminated sulfolane turns from colorless to black, becomes more viscous and gooey, acidic (to a pH level as low as 4) and corrosive. In general the following four items are seen as the main causes for corrosion/erosion problems in the sulfolane extraction unit.

Oxygen in the plant (ingress or via incoming flows)
Chlorine in circulating solvent
Accumulation of degradation and corrosion products in the plant
High temperature in reboilers The degradation and corrosion products are gooey, gummy, tacky, smelly, and difficult and unpleasant to handle. Over the years, degradation and corrosion products will have accumulated in the plant. These degradation and corrosion products will deposit in the system to plug the filters, carbon adsorption bed to increase the pressure drop and most importantly to reduce the heat transfer coefficient of the heat exchangers, leading to poor operation efficiency. In addition, the dirt accumulated in the plant is usually corrosive material and/or act as a kind of catalyst to make more degradation products. An expedient way to control corrosion is to neutralize the acid by addition of monoethanol amine (MEA), leading to additional contamination of the sulfolane solvent. The experience from the operation indicates that once in a while a very thorough cleaning of the plant is required. In a commercial sulfolane extraction unit, about 10-15 $m^3$ of dirt was taken out of the unit. It is indeed, a hard job to clean the sulfolane extraction unit thoroughly.

There are many ways to keep the sulfolane in the circulation unit clean, including:

1) A filter bed or cartridge is placed in the lean sulfolane transfer line to catch the degradation and corrosion products. However, the filter or cartridge can be overcome by the large quantity of the degradation and corrosion products in short time. Most of the commercial units are equipped with such filters but the filters are mostly bypassed because of operational difficulties.
2) Twin adsorption towers filled with adsorbent such as activated carbon to remove the degradation and corrosion products. Commercial experience indicates that such adsorption tower is impractical because it can be plugged up quickly and it is difficult to clean and change the adsorbent.
3) Reclamation of sulfolane: A small split stream of sulfolane laden with the degradation and corrosion products is withdrawn from the circulation system and charged into a vacuum distillation unit. The overhead is clean sulfolane for recycling to the circulation system, while the bottom is the degradation and corrosion products, which are disposed as waste. The operation is inefficient because only a small fraction of the solvent in the system is reclaimed. In addition, there is significant amount of hazardous waste generated for disposal.
4) Use of cationic and/anionic resins to remove the acidic contaminants, including sulfonic acid, and small amount of carboxylic acid and hydrochloric acid. U.S. Pat. No. 5,053,137 by Lal and Bhat taught purification or regeneration of contaminated or spent process sulfolanes by passing a split stream of it through two columns in series. The first column is filled with cationic exchanger while the second column is filled with anionic exchanger. Liu and Li showed that the acid in the degradation and corrosion products could be effectively ion exchanged with cationic resin [Liu lingchi and Li Dongsheng, Petrochemical Design, 2002, 19(2) 31-33], leading to cleaner sulfolane solvent. The acid laden cationic resin is regenerated with NaOH solution. In the process, only a split stream is ion exchanged, so that the efficacy in improving sulfolane quality is limited. The process is messy and produces a great quantity of hazardous waste for disposal.

To control the corrosion rate, the acid can be neutralized by use of amines, such as monoethanol amine (MEA). However, the degradation and corrosion products remain in the circulation system to foul up the heat exchangers and to cause plugging and increase in pressure drop. In addition, the accumulated degradation and corrosion products catalyze the degradation of sulfolane due to autocatalysis and accelerate the corrosion and accumulation of degradation and corrosion products leading to a vicious cycle. Thus, a significant amount of purge is required to keep the quality of sulfolane at an acceptable level.

The prior art on controlling sulfolane corrosion and rejuvenating sulfolane in the circulation loop suffers from a number of disadvantages including:
1) High corrosion rate of the system because the accumulated degradation and corrosion products catalyze the degradation of sulfolane and accelerate the corrosion and accumulation of degradation and corrosion products, leading to a vicious cycle.
2) Accelerated rate of accumulation of the degradation and corrosion products due to their autocatalysis.
3) Tedious, dangerous and expensive operation in replacing the filters and/or adsorbents.
4) Decreased operation capacity and efficiency when the quality of sulfolane is not maintained at or higher than the desired level.
5) Inefficient in rejuvenation of sulfolane solvent due to split stream operation.
6) High operation and maintenance costs.

Clearly, there is a need in the industry for an efficient, safe and economic method to rejuvenate the contaminated sulfolane to operate the aromatic extraction system safely, efficiently with high capacity, and low operation and maintenance costs.

SUMMARY OF THE INVENTION

The present invention provides a continuous process for rejuvenating contaminated sulfolane in the circulation loop of an aromatic extraction system to a quality substantially the same as the fresh sulfolane. In particular, the process employs a novel rejuvenator to rejuvenate the contaminated sulfolane solvent by removing the degradation and corrosion products from the total stream in the circuit to keep the capacity and operation efficiency of the aromatic extraction system high.

A novel rejuvenator for removing the degradation and corrosion products is placed in the contaminated sulfolane solvent system to treat the total stream in circulation. The preferred locations for the rejuvenator is in the lean sulfolane section, and the coolest location after the cooler and before entering the extraction column is most preferred. Two rejuvenators are placed in parallel so that the rejuvenator online can be switched over to the spare rejuvenator for discharging the collected degradation and corrosion products. Specifically, the rejuvenator comprises a high pressure vessel with a removable cover, and a round rack with vertical stainless steel tubes fitted in the high pressure vessel. A magnetic bar is placed in each stainless steel tube. A ring of stainless steel tubes is installed inside the screen cylinder. The rejuvenator picks up the contaminants as the contaminated sulfolane is passed through the rejuvenator. The rejuvenator can be disassembled for removing the contaminants periodically.

As the contaminated sulfolane enters the rejuvenator, the degradation and corrosion products are attracted and adhere to the vertical stainless steel tubes filled with powerful magnetic bars, and removed from the solvent system. The removal of the degradation and corrosion products by the magnetic bar is enhanced by the presence of the inner screen cylinder. This enhancement becomes crucial when the level of residual degradation and corrosion products is to be kept low. Through the inner screen cylinder, the rejuvenated, clean sulfolane leaves the rejuvenator and is recycled back to the extraction column. After on stream for a certain period, say two weeks, the rejuvenator is loaded with the degradation and corrosion products and the pressure drop across the rejuvenator increases. The stream is switched to the spare rejuvenator and the degradation and corrosion products loaded rejuvenator is opened to remove the round tray along with the magnetic bars. The round tray with the magnetic bar in the vertical tube is placed in a container and the magnet is removed from the tube. Upon removal of the magnetic bars, the degradation and corrosion products fall from the vertical due to removal of the magnetic bars and loss of the attractive force. The system is characterized by high efficiency for contaminants removal, simple construction, and low operation and maintenance costs.

Accordingly, several objectives and advantages of the present invention are as follows:
1) Low corrosion rate due to removal of corrosive acids, the degradation and corrosion products.
2) Low accumulation of the degradation and corrosion products due to removal of the autocatalysts.
3) No tedious, dangerous and expensive operation to clean the system and replace the filters and/or adsorbents.
4) Stable operation capacity and efficiency by maintaining the quality of sulfolane at nearly the fresh level.
5) Efficient rejuvenation of sulfolane solvent due to whole stream rejuvenation of sulfolane in the circulation circuit.
6) Low operation and maintenance costs.

Further objectives and advantages will become apparent from a consideration of the ensuing description and drawing.

DETAILED DESCRIPTION OF THE PREFERRED EMBODIMENTS

In accordance with the present invention, the whole stream of the contaminated lean sulfolane solvent is passed continuously through the rejuvenator of the present invention to remove acids, and the degradation and corrosion products to maintain the sulfolane solvent quality essentially the same as the fresh one. The novel rejuvenator is the heart of the present invention. The installation and operation of the rejuvenator are critical as well.

The Rejuvenator

The rejuvenator is the heart of the present invention. The invention and design of the rejuvenator is based on the discovery of the nature of the degradation and corrosion products. The accumulated degradation and corrosion products are generally considered to be:

1. The acid produced from oxidation of sulfolane, such as sulfonic acid and sulfuric acids
2. Acid from chlorine such as hydrochloric acid
3. Oligomers of sulfolane produced from oxidative condensation of sulfolane and its degradation products These products are acidic, low in pH, black, gooey and tend to deposit in the system, such as the lines, filters and heat exchangers, causing losses in operation capacity and efficiency. These products are hard to remove from the solvent circuit and the process equipment. Removing these products from the solvent system and cleaning the system equipment are the subjects of research in the petroleum and petrochemical industries throughout the world.

In our research, we discovered that the gooey product contains fine but gritty black particles. Further characterization of the products revealed that these products are paramagnetic in nature and can adhere to a magnet. We were surprised that, by use of a magnet, these products were removed and the contaminated sulfolane solvent became clear and its property restored. It is believed that, in the process operation, the equipment is corroded by the acidic byproduct and Fe ion is released. The iron ion reacts further with sulfur, oxygen and water to form fine paramagnetic particles of FeS, FeO and $Fe(OH)_2$, etc. It is these fine black particles that make the sulfolane solvent black. These fine paramagnetic particles are then occluded in the organic degradation products and make the whole mass of the degradation and corrosion products paramagnetic. Thus, by use of a magnet, the whole mass of degradation and corrosion products can be miraculously removed from the contaminated solvent to rejuvenate the used solvent. Through experimentation and testing, a novel rejuvenator was designed and its efficacy was proved.

Figure 1:
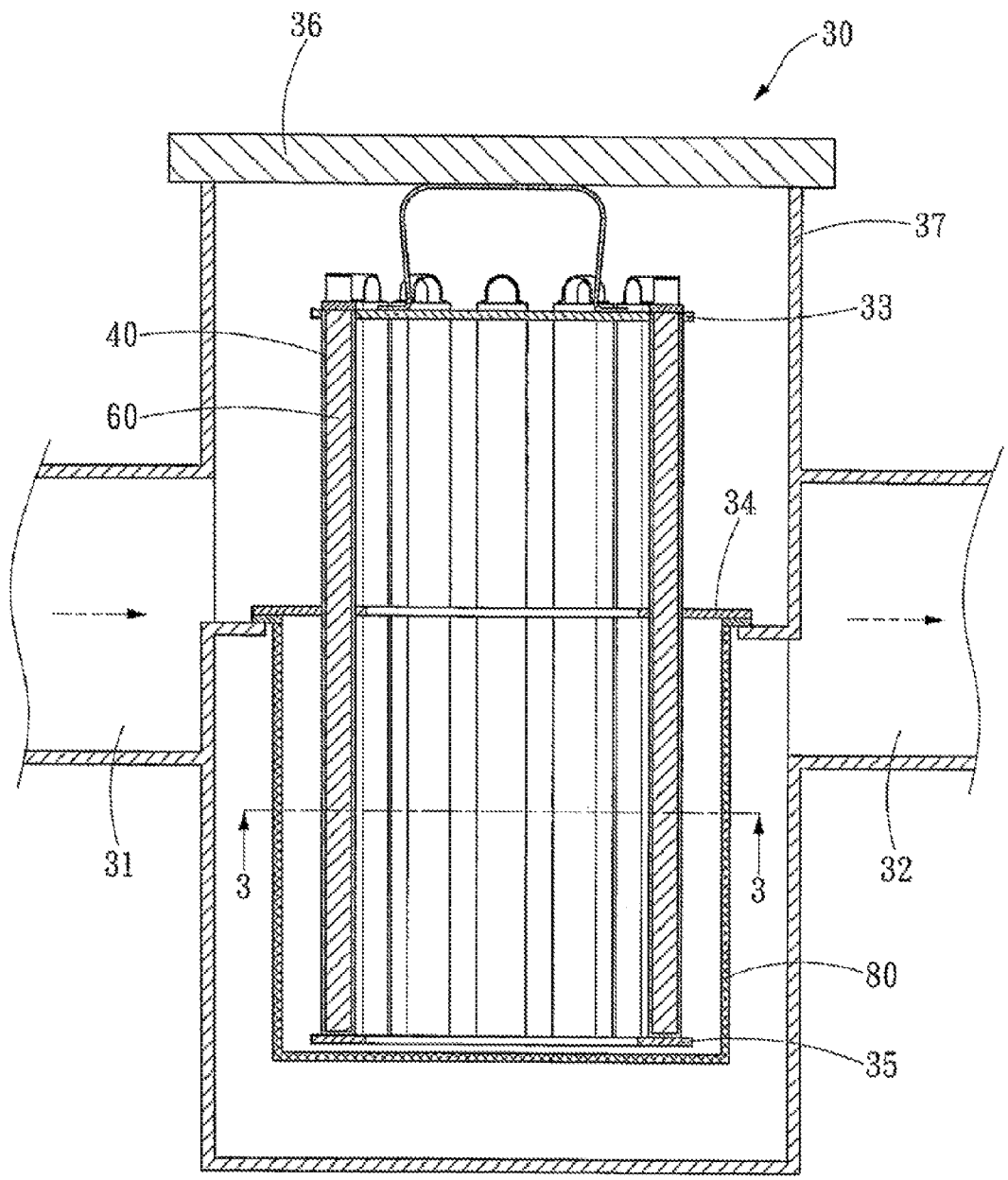
FIG. 1 is a schematic view showing the vertical section of the rejuvenator in a preferred embodiment according to the present invention.
Figure 2:
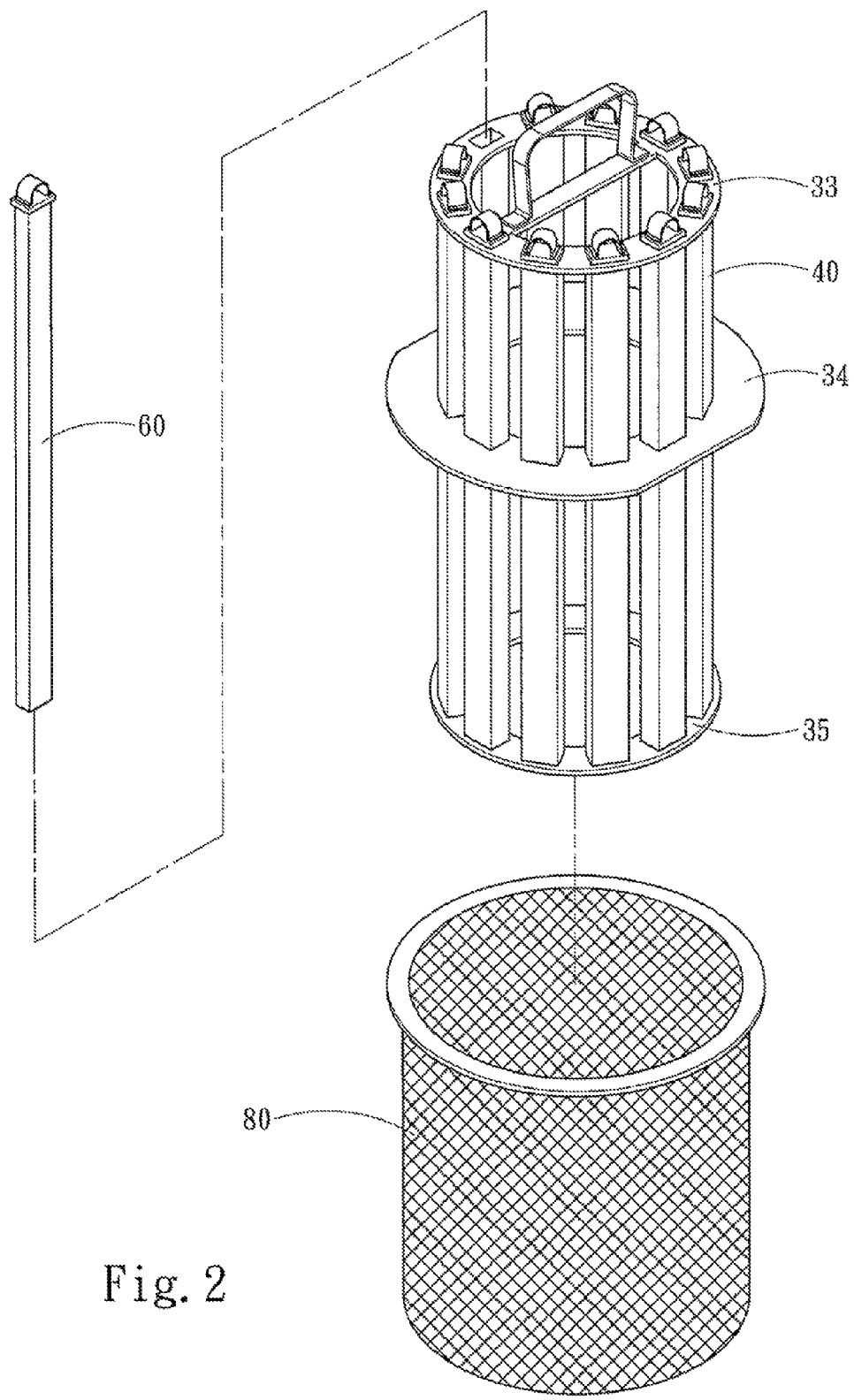
FIG. 2 is a schematic view showing the structural decomposition of the rejuvenator in a preferred embodiment according to the present invention.
Figure 3:
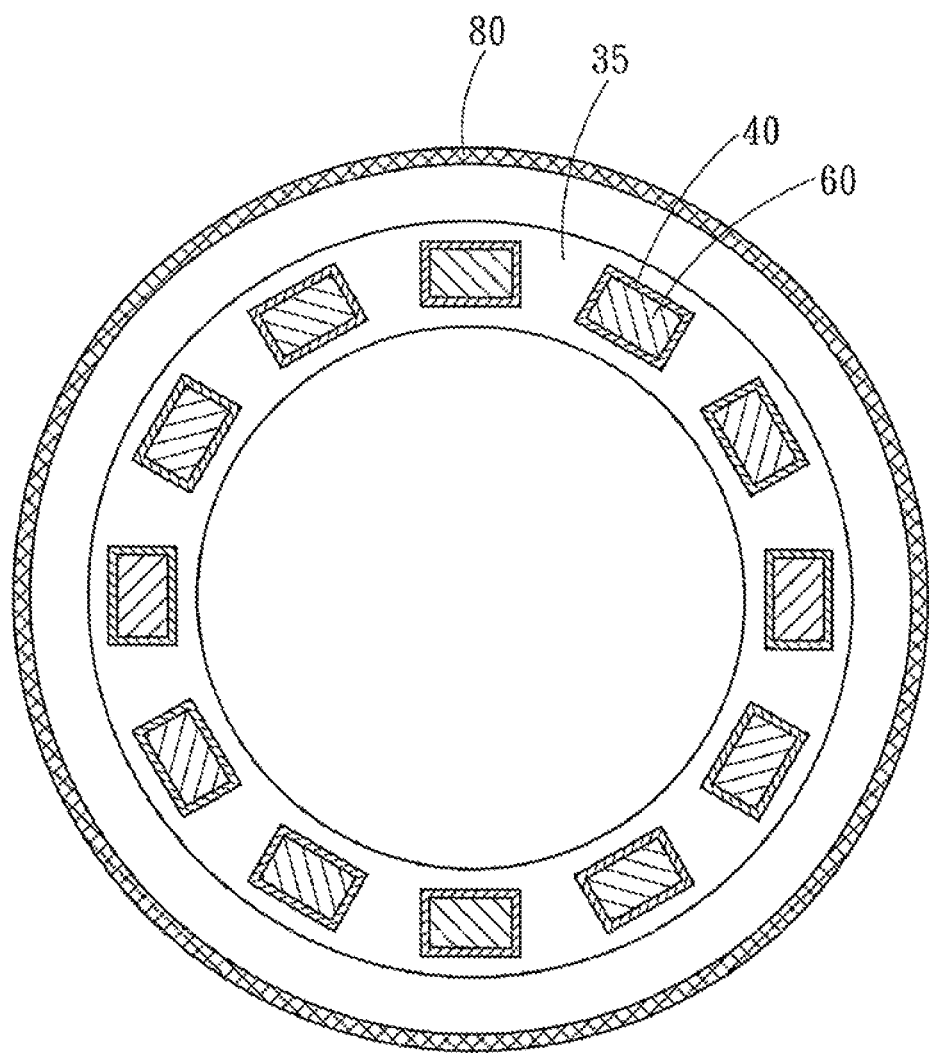
FIG. 3 is a schematic view showing the 3-3 section in the FIG. 1.

The schematic views of the rejuvenator are shown in FIG. 1 to FIG. 3, respectively. The rejuvenator 30 comprises a high pressure vessel 37 with a removable cap 36 to withstand the pressure of the aromatic extraction system. The rejuvenator 30 is equipped with inlet 31 and outlet 32. Inside the high pressure vessel 37, a screen cylinder 80 is fitted. The mesh size of the screen can range from 1 to 200 (wires per inch), and 10 to 100 (wires per inch) is preferred. Inside screen cylinder 80, three round racks 33, 34, 35 are spaced from the top to the bottom. To the round racks 33, 34, 35, plural stainless tubes 40 are attached. The number of stainless steel tubes 40 can range from 2 to 30 or more. In this embodiment, there are 12 stainless tubes attached to the round racks 33, 34, 35. Into each of the stainless tubes 40, magnetic bars 60 are inserted.

Process Configuration

Figure 4:
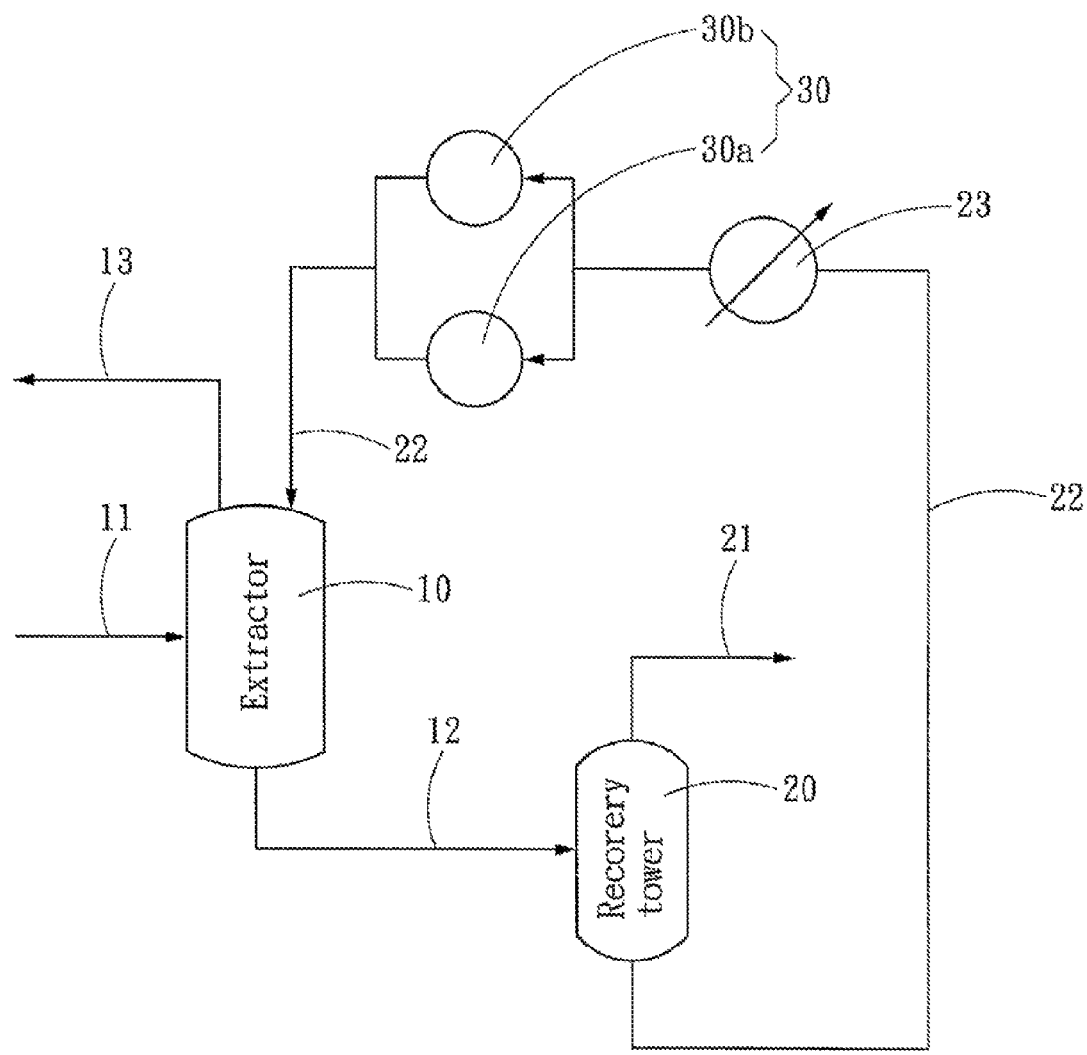
FIG. 4 is a schematic flow diagram of an extraction system containing the rejuvenator of the present invention.

A schematic flow diagram of a typical aromatic extraction system is shown in FIG. 4. Feed 11 is introduced into extractor 10. The lean solvent 22 is introduced from the top of extractor 10. The raffinate phase 13 is removed from the top of extractor 10 to recover non-aromatics, while the extract phase 12 is withdrawn from the bottom and charged to recovery tower 20 to recover aromatics as the overhead 21 and recover the lean solvent 22 as the bottom for recycling to extractor 10. The lean solvent 22 is cooled with heat exchanger or air cooler 23, and passed through the rejuvenator 30 before returning to extractor 10.

It is important to make the rejuvenator 30 effective and efficient. To accomplish this objective, we found that the best way is to treat the whole stream rather than a split stream. Thus, the regenerator 30 is placed in the circulation loop to treat the whole stream.

To make rejuvenation truly continuous, two rejuvenators 30A, 30B are installed in parallel so that one is on rejuvenation while the other is on cleaning.

Please refer to FIG. 1 and FIG. 4. The lean solvent 22 is introduced into the rejuvenator 30 through inlet 31 and flows down along the stainless tubes 40 containing the magnetic bars 60 and finally exits through outlet 32. The screen cylinder 80 is intended to minimize the short-circuiting of the lean solvent 22 inside rejuvenator 30.

As the on-stream time of rejuvenator 30A, 30B increases, the degradation and corrosion products continue to gather and accumulate around the stainless tubes 40 containing magnetic bars 60. The pressure across rejuvenator 30 increases and has to be cleaned. Depending on the cleanliness of the sulfolane system, the time period for rejuvenator 30A, 30B cleaning can range from 2 to 30 days or longer.

To clean rejuvenator 30A, lean solvent 22 is switched to the rejuvenator 30B to continue operation. The top cap 36 is removed, and then the ring rack along with the stainless tubes 40 and magnetic bars 60 are removed from rejuvenator 30. The surface and the spaces between the stainless tubes 40 are now full of the accumulated degradation and corrosion products. When the magnetic bars 60 are removed from the stainless tubes 40, the accumulated degradation and corrosion products drop off cleanly by gravity. The magnetic bars 60 are put back into the stainless tubes 40, and the round rack 33, 34, 35 is put back into rejuvenator 30, and finally, the top cap 36 is put on to complete the cleaning procedure. Rejuvenator 30 A is now ready for service again.

Process Conditions

The rejuvenator 30 can be operated at the temperatures found in typical extraction systems. However, a too high temperature can lead to loss in magnetic field, while a too low temperature can lead to high efficiency due to increased tendency for the degradation and corrosion products to adhere to the magnets. The operation temperature can range from 10 to 200° C. and 20 to 150° C. is preferred. Thus, the preferred location of the rejuvenator 30 is after the heat exchanger 23 and before the extractor 10 in the lean solvent 22 circuit.

For efficient operation, the flow velocity through the rejuvenator 30 in term of superficial velocity can be 10 to 10,000 v/v/Hr and 50 to 5,000 v/v/Hr is preferred.

The pressure drop across the rejuvenator 30 is an indicator of the cleanliness or the remaining capacity of the rejuvenator 30. When the pressure drop (delta P) across the rejuvenator 30 is 1 to 5 $Kg/Cm^2$ or higher, the rejuvenator 30 should be cleaned according to the procedure described above.

EXAMPLES

Example 1

Two rejuvenators were constructed. The dimensions were 33 Cm in diameter and 65 Cm in height, with a volume of 55 Liter. Magnetic bars were inserted in the stainless steel tubes on the round racks. The size of the screen cylinder was 80 meshes. The rejuvenators were installed side by side in the lean sulfolane circuit below the cooler and before the extractor.

Example 2

The rejuvenators were tested in an aromatic extraction system in a refinery. This extractor had been in operation for 3 years and the lean sulfolane solvent was dirty, corrosive and full of gooey degradation and corrosion products. The extractor was 3,600 mm ID×42,000 mm T-T. The feed to the extractor is 42,531 Kg/Hr of reformate. The circulation rate of the contaminated lean sulfolane through the rejuvenator and to the extractor was 138,602 Kg/Hr. Thus, solvent to feed ratio for this test was about 3. The rejuvenator was cleaned as the pressure drop across the rejuvenator reached 2 Kg/Cm$^2$. At the start of the test, the lean sulfolane solution was so dirty, the rejuvenator has to be cleaned at the end of 1 week. However, as the lean sulfolane solution continued to be cleaned up by the rejuvenator, the periods of rejuvenator cleaning increased from 1 week to 2 weeks, to 4 weeks and 3 months. When the rack was removed from the rejuvenator, the surface and the spaces between the stainless steel tubes were full of black, gooey degradation and corrosion product. As the magnetic bars were removed, the black, gooey degradation and corrosion products fell off, and the stainless tube became clean for reuse.

The samples before and 3 months after installation of the rejuvenator were characterized to show the efficacy of the rejuvenator of the present invention. The properties characterized were:

1) The quantity of the residue left from distilling the lean sulfolane solvent to 288° C. Since sulfolane boils at 285° C., the residue must be the degradation and corrosion product. Thus, the lower the residue content, the cleaner the lean sulfolane solvent.
2) The color of the lean sulfolane solution: Since the degradation and corrosion products are highly colored, the lighter the color, the cleaner the sulfolane solution.
3) The rate of amine (monoethanol amine): Since acid is generated in the process of sulfolane degradation, the lower the addition rate of amine to maintain a constant pH, say 8, the cleaner the sulfolane solution.
4) The rate of sulfolane make-up rate: Since sulfolane degrades in the process, certain amount of lean sulfolane solvent has to be purged off to maintain the quality of the sulfolane quality. Therefore, fresh sulfolane has to be added to make-up the volume. Thus, the lower the fresh sulfolane make-up rate, the cleaner the sulfolane solution.

The test results are shown in Table 1.

TABLE 1

| Sample | Before Rejuvenation | 3 months of rejuvenation |
| --- | --- | --- |
| 1. Quantity of residue, % | 1.0 | 0.4 |
| 2. Color, Number | 3 | 0.5 |
| 3. MEA addition, Kg/Y | 200 | 50 |
| 4. Sulfonate make up, Kg/Mo | 1000 | 50 |

The quantities of residue based on ASTM method 86 were 1.0 and 0.4% for the samples before and after 3 months of rejuvenation, respectively. It was noted that the extraction system was very dirty with a large quantity of degradation and corrosion products. Thus, the sample taken for this test was not representative and the real residue content would have been much higher than the 1% shown. In contrast, the extraction system after 3 months of rejuvenation was surprisingly clean and the residue content of 0.4% was a good representation of the lean sulfolane in the system.

The colors of the samples before and after 3 months of rejuvenation were strikingly different. This observation is consistent with the results of the color number based on ASTM D1500 of 3 and 0.5.

The above results clearly show that the rejuvenator of the present invention is effective in rejuvenating the contaminated or spent sulfolane solution.

Those described above are the preferred embodiments to exemplify the present invention. However, it is not intended to limit the scope of the present invention. Any equivalent modification or variation according to the spirit of the present invention is to be also included within the scope of the present invention.

What is claimed is:

1. A process for online rejuvenation of contaminated sulfolane solvent in an aromatic extraction system that includes an aromatic extractor device and art aromatic recovery device which comprises the steps of:
    (a) establishing a closed lean sulfolane circulation loop that includes the aromatic extractor device (AED) and the aromatic recovery device (ARD) wherein a feed stream containing aromatics and non-aromatics is introduced into the AED at a first position and wherein a lean sulfolane solvent stream containing sulfolane is introduced into the AED at a second position whereby the AED generates a raffinate stream containing the non-aromatics and an extractive stream containing sulfolane and the aromatics, wherein the extractive stream is introduced into the ARD whereby the ARD generates an aromatics stream and a contaminated solvent stream;
    (b) providing a high pressure vessel having an inlet and an outlet in the closed lean sulfolane circulation loop wherein the high pressure vessel includes magnets that remove organic degradation products that are occluded with corrosion products which contain paramagnetic particles that are formed from iron ions that are released into the sulfolane solvent;
    (c) maintaining an inlet stream of contaminated sulfolane solvent, that is from the contaminated solvent stream, at a temperature wherein organic degradation products are occluded with corrosion particles;
    (d) introducing the inlet stream of contaminated sulfolane solvent through the inlet so that organic degradation products that are occluded with the corrosion particles are attracted by and adhered to the magnets; and
    (e) recovering, a stream of rejuvenated, clean sulfolane solvent from the outlet that is delivered to the AED as the lean sulfolane solvent stream.

2. The process of claim 1 wherein in step (c) the inlet stream of contaminated solvent is maintained at a temperature between 10 and 200° C.

3. The process of claim 1 wherein step (b) comprises employing a solvent rejuvenation apparatus that comprises:
    the high pressure vessel with a removable cover;
    a rack with a plurality of stainless steel tubes fitted within the high pressure vessel, wherein a magnetic bar is inserted into each of the stainless steel tubes;
    a screen cylinder fitted in the rack at the center of the high pressure vessel, wherein the screen cylinder partially encloses the plurality of stainless steel tubes;
    the inlet through which the contaminated sulfolane stream enters the high pressure vessel such that the contaminated sulfolane comes into direct communication with the plurality of stainless steel tubes without having to pass through the screen cylinder; and
    the outlet through which rejuvenated clean sulfolane, subsequent to passing through the screen cylinder, exits the high pressure vessel and wherein each stainless steel tube is separated from the outlet by the screen cylinder.

4. The process of claim 3 wherein each magnetic bar is removable from the stainless steel tube in which it is inserted whereby accumulated degradation and corrosion products drop off the tube.

5. The process of claim 1 wherein step (b) comprises employing a system for removing degradation and corrosion products from a stream of contaminated sulfolane solvent that comprises:
- the high pressure vessel having a removable cover and defining an interior region and configured with an inlet through which the stream of contaminated sulfolane solvent enters the interior region and an outlet through which the stream of clean sulfolane solvent exits the interior region;
- a plurality of stainless steel tubes positioned within the interior region wherein the stainless steel tubes enclose magnetic bars therein; and
- a screen positioned between the plurality of stainless steel tubes and the outlet, wherein the stream of contaminated sulfolane solvent is first channeled to contact the plurality of stainless steel tubes, which attract the degradation and corrosion products that become adhered to the stainless steel tubes, to yield a clean sulfolane stream that passes through the screen and exits through the outlet and characterized in that each magnetic bar is removable from the stainless steel tube in which it is inserted whereby accumulated degradation and corrosion products drop off the tube.

6. The process of claim 5 wherein the screen is configured to partially enclose the plurality of stainless steel tubes.

7. The process of claim 6 wherein the screen has a configuration defining a hollow interior, wherein the plurality of stainless steel tubes is secured to a rack that is supported by the screen such that a lower portion of the plurality of stainless steel tubes is positioned within the hollow interior.

8. The process of claim 1 wherein the sulfolane solvent circulates in the closed lean sulfolane circulation loop and sulfolane is added into the loop to replenish the sulfolane as necessary.

9. The process of claim 1 wherein the inlet stream of contaminated solvent is cooled before entering; into the inlet of the high pressure vessel.

10. The process of claim 1 wherein the stainless steel tubes and magnetic bars number from 2 to 30.

11. The process of claim 3 wherein the screen cylinder has a mesh size of 1 to 200 wires per inch.

12. The process of claim 11 wherein the screen cylinder has a mesh size of 10 to 100 wires per inch.

13. The process of claim 3 wherein the plurality of stainless steel tubes is oriented vertically thereby defining an upper end and a lower end, wherein the lower end of the plurality of stainless steel tubes is enclosed by the screen cylinder and wherein the upper end of the plurality of stainless steel tubes is not enclosed by the screen cylinder.

14. The process claim 13 wherein the inlet is located, in an upper portion of the pressure vessel and the outlet is located in a lower portion of the pressure vessel.

15. The process of claim 5 wherein the system comprises 2 to 30 stainless steel tubes and corresponding magnetic bars.

16. The process of claim 5 wherein the screen is configured to partially enclose the plurality of stainless steel tubes.

17. The process of claim 16 wherein the screen has a configuration defining a hollow interior, wherein the plurality of stainless steel tubes is secured to a rack that is supported by the screen such that a lower portion of the plurality of stainless steel tubes is positioned within the hollow interior.

18. The process of claim 17 wherein the screen has an upper perimeter on which the rack rests.

19. The process of claim 18 wherein the screen has a cylindrical configuration.

20. The process of claim 19 wherein the rack has a round perimeter.

* * * * *